United States Patent [19]
Usami

[11] Patent Number: 5,091,660
[45] Date of Patent: Feb. 25, 1992

[54] SEMICONDUCTOR LOGIC CIRCUIT

[75] Inventor: Kimiyoshi Usami, Yokohama, Japan

[73] Assignee: Kabushiki Kaisha Toshiba, Kawasaki, Japan

[21] Appl. No.: 391,164

[22] Filed: Aug. 9, 1989

[30] Foreign Application Priority Data
Aug. 9, 1988 [JP] Japan .................. 63-197171

[51] Int. Cl.⁵ .............. H03K 19/082; H01J 19/82
[52] U.S. Cl. ................... 307/463; 307/219;
307/244; 307/443; 307/451; 307/465; 307/469;
341/67; 341/95
[58] Field of Search ............ 341/67, 95; 307/443,
307/448, 451, 463, 465, 468–469, 572, 242, 244,
219

[56] References Cited
U.S. PATENT DOCUMENTS

| | | | |
|---|---|---|---|
| 3,651,516 | 3/1972 | Andreae | 341/67 |
| 3,909,781 | 9/1975 | Krol et al. | 341/95 |
| 4,177,456 | 12/1979 | Fukinuki | 341/67 |
| 4,728,929 | 3/1988 | Tanaka | 341/95 |

FOREIGN PATENT DOCUMENTS
0228649  7/1987  European Pat. Off. .
62-262518 11/1987  Japan .

Primary Examiner—Stanley D. Miller
Assistant Examiner—Margaret Rose Wambach
Attorney, Agent, or Firm—Foley & Lardner

[57] ABSTRACT

A semiconductor logic circuit for realizing bit expansion comprises a series of CMOS transfer gates that transfer, for example, a fourth bit of input data to all bit positions upper than the fourth bit. The transfer of the fourth bit is done through clocked inverters. Each of the clocked inverters gives the fourth bit to, for instance, four of the upper bit positions in parallel.

14 Claims, 6 Drawing Sheets 5,091,660

SEMICONDUCTOR LOGIC CIRCUIT

BACKGROUND OF THE INVENTION

1. Field of the Invention

The present invention relates to a semiconductor logic circuit, and particularly to a semiconductor logic circuit for achieving logic function of expanding 4-bit, 8-bit or 16-bit data to 32-bit data. Such data are used in large scale integrated circuits (LS1) such as microprocessors.

2. Description of the Prior Art

It is frequently required to expand data of a particular bit length to data of another bit length and to process the expanded data. FIG. 1 shows a conventional logic circuit that achieves such bit expansion.

The logic circuit of FIG. 1 expands 4-bit, 8-bit or 16-bit data to 32-bit data. This logic circuit receives input data D0 to D31 and control signals EX4, EX8 and EX16 corresponding to the bit length of the input data, and outputs 32-bit data Z0 to Z31.

It is assumed that the logic circuit of FIG. 1 receives 4-bit input data of "1011" as D28=1, D29=0, D30=1 and D31=1. Since the 4-bit data is expanded to 32-bit data, the control signal EX4 will be 1 and the remaining control signals EX8 and EX16 will each be 0. Due to the control signal EX4 of 1, 4-input selectors 100 to 115, 3-input selectors 116 to 123 and 2-input selectors 124 to 127 select the most significant bit, i.e., the input D28 out of the 4-bit input data. Therefore, the outputs Z0 to Z27 will each be the input D28, i.e., 1 while the outputs Z28 to Z31 will be the inputs D28 to D31, respectively. Namely, the outputs Z0 to Z31 will be "111 ... 11011" (twenty-eight 1s plus "1011"). In this way, 4-bit data is expanded to 32-bit data.

Similarly, 8-bit input data can be expanded to 32-bit data. For example, data of "10010101" may be given to the inputs D24 to D31, and only the control signal EX8 is set to 1. Then, the 2-input selectors 124 to 127 select the input data D24 to D27, which are outputted as they are from the outputs Z24 to Z27. On the other hand, the 4-input selectors 100 to 115 and 3-input selectors 116 to 123 select the most significant bit "1" of the outputs Z0 to Z23. As a result, twenty-four 1s and the eight-bit data of "10010101" are outputted, thereby completing the expansion from 8-bit data to 32-bit data. Expansion from 16-bit input data to 32-bit data will be performed similarly.

As described in the above, the conventional logic circuit for achieving the bit expansion employs 4-input selectors, 3-input selectors and 2-input selectors. Therefore, hardware size of the logic circuit is large to inevitably increase the area of a chip.

FIGS. 2(a), 2(b) and 2(c) show examples of the 4-input selector, 3-input selector and 2-input selector employed in the logic circuit of FIG. 1, respectively. Assuming the selectors are formed of CMOS transistor circuits, the 4-input selector shown in FIG. 2(a) requires twenty elements, the 3-input selector of FIG. 2(b) requires fourteen elements, and the 2-input selector of FIG. 2(c) requires ten elements. As a result, the logic circuit will require a great amount of hardware.

SUMMARY OF THE INVENTION

An object of the present invention is to provide a semiconductor logic circuit that achieves an expansion logic function with a remarkably reduced number of elements.

In order to accomplish the object, the present invention provides a semiconductor logic circuit comprising CMOS transfer gates. Each of the CMOS transfer gates comprises a pair of MOS transistors including a P-channel transistor and an N-channel transistor where sources of the transistors are connected to each other and drains of the transistors are also connected to each other. The CMOS transfer gates are connected in series and arranged in respective stages, depending on the number of bits to which expansion is sought. A plurality of clocked inverters are arranged such that the output terminals of the clocked inverters are connected to source or drain electrodes of the transfer gates disposed in a specific one of the stages. Input terminals of the clocked inverters are connected to each other.

In expanding bit data, for example 8-bit data to 32-bit data, with the arrangement mentioned above, each of the clocked inverters is used to transfer an expansion bit to three higher bit positions in parallel at one time. As a result, the bit expansion operation is achieved at a high speed.

According to the invention, the number of elements that are needed purely for performing bit expansion and zero expansion is about 60% of that needed by the conventional bit expansion technique.

These and other objects, features and advantages of the present invention will be more apparent from the following detailed description of preferred embodiments in conjunction with the accompanying drawings.

DETAILED DESCRIPTION OF THE EMBODIMENTS

Figure 1:
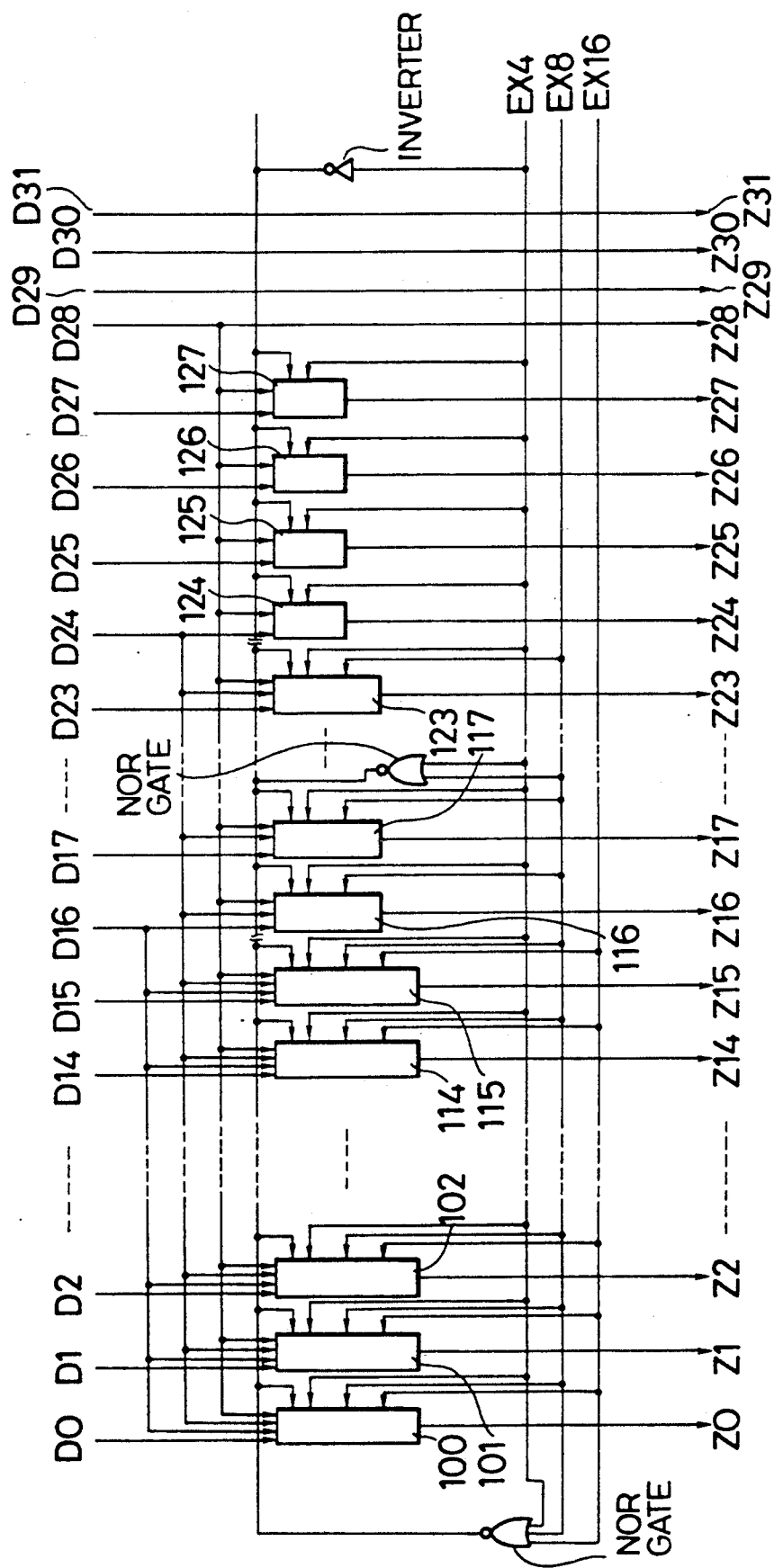
FIG. 1 is a schematic diagram showing a logic circuit of prior art.
Figure 2A:
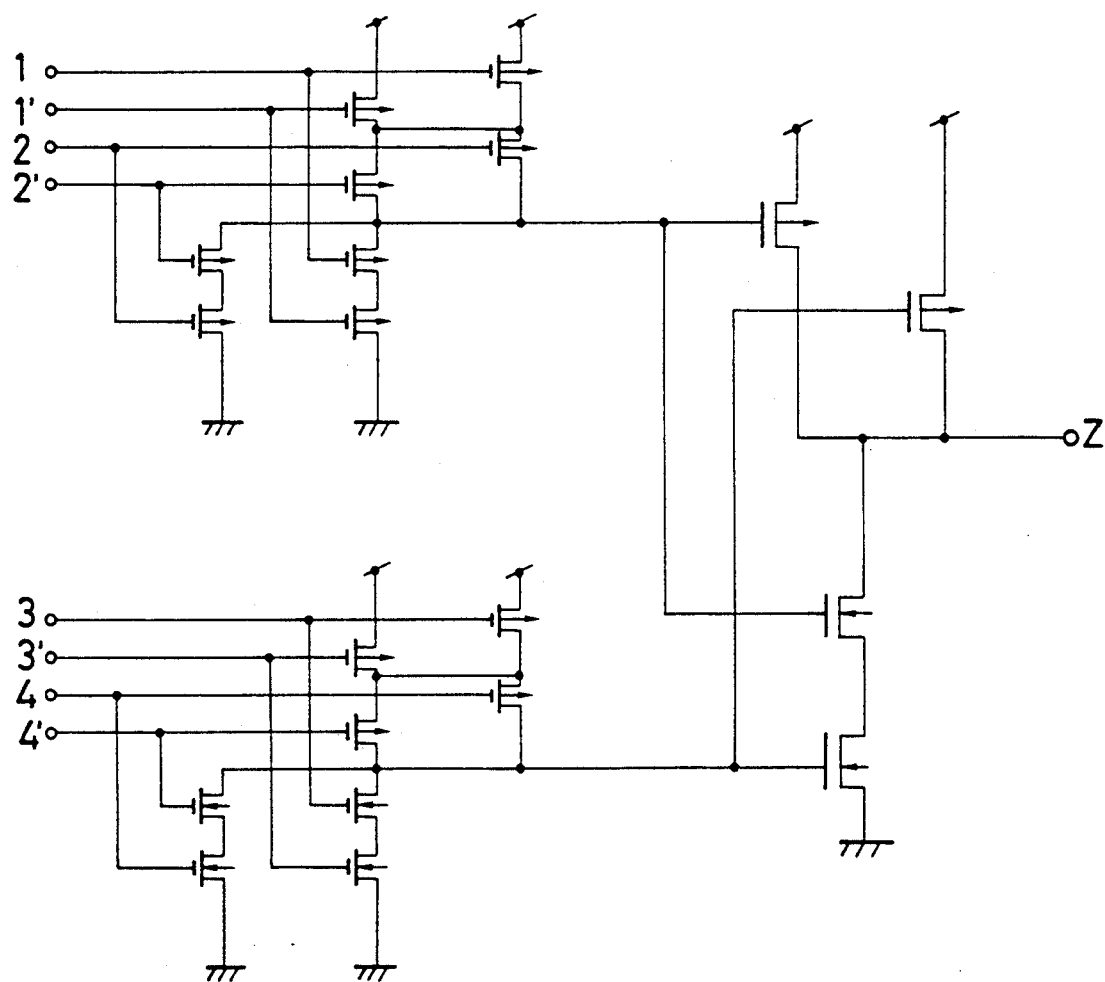
FIG. 2(a) is a view showing the details of a 4-input selector shown in FIG. 1.
Figure 2B:
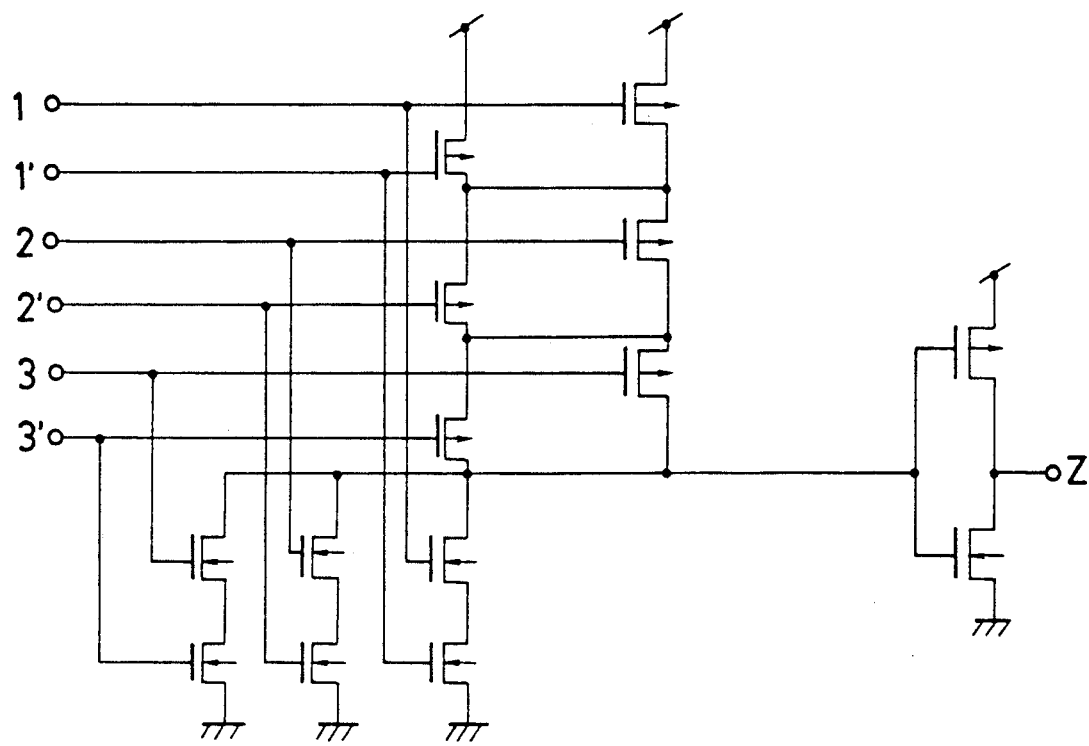
FIG. 2(b) is a view showing the details of a 3-input selector shown in FIG. 1.
Figure 2C:
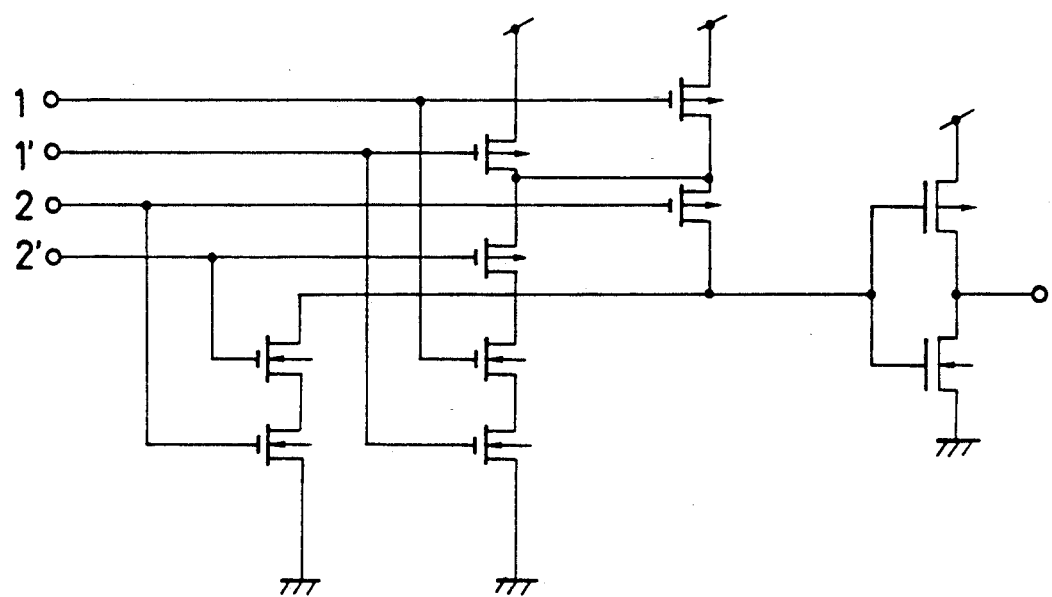
FIG. 2(c) is a view showing the details of a 2-input selector shown in FIG. 1.
Figure 3A:
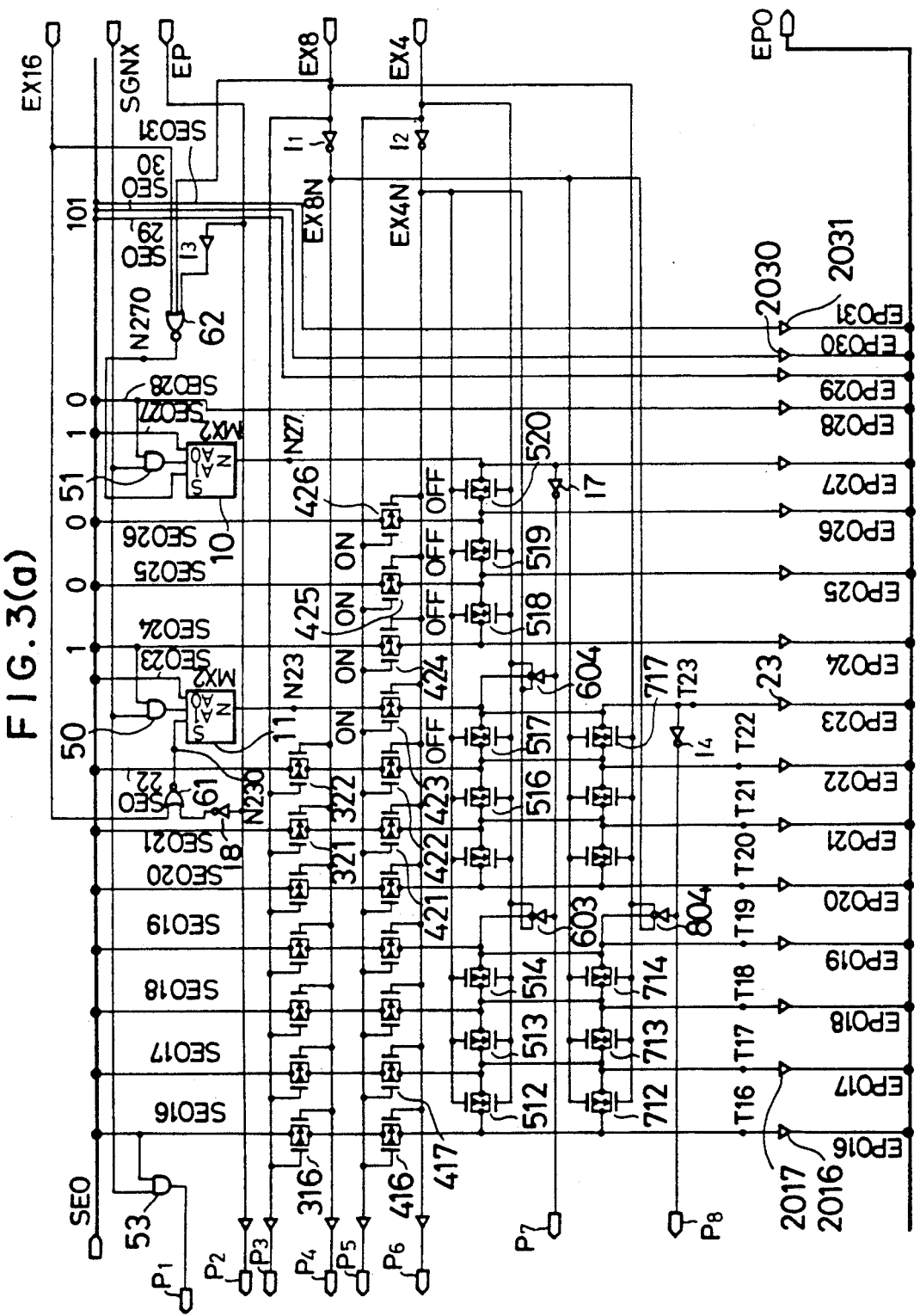
FIGS. 3(a) and 3(b) are views showing a semiconductor logic circuit according to an embodiment of the invention.
Figure 3B:
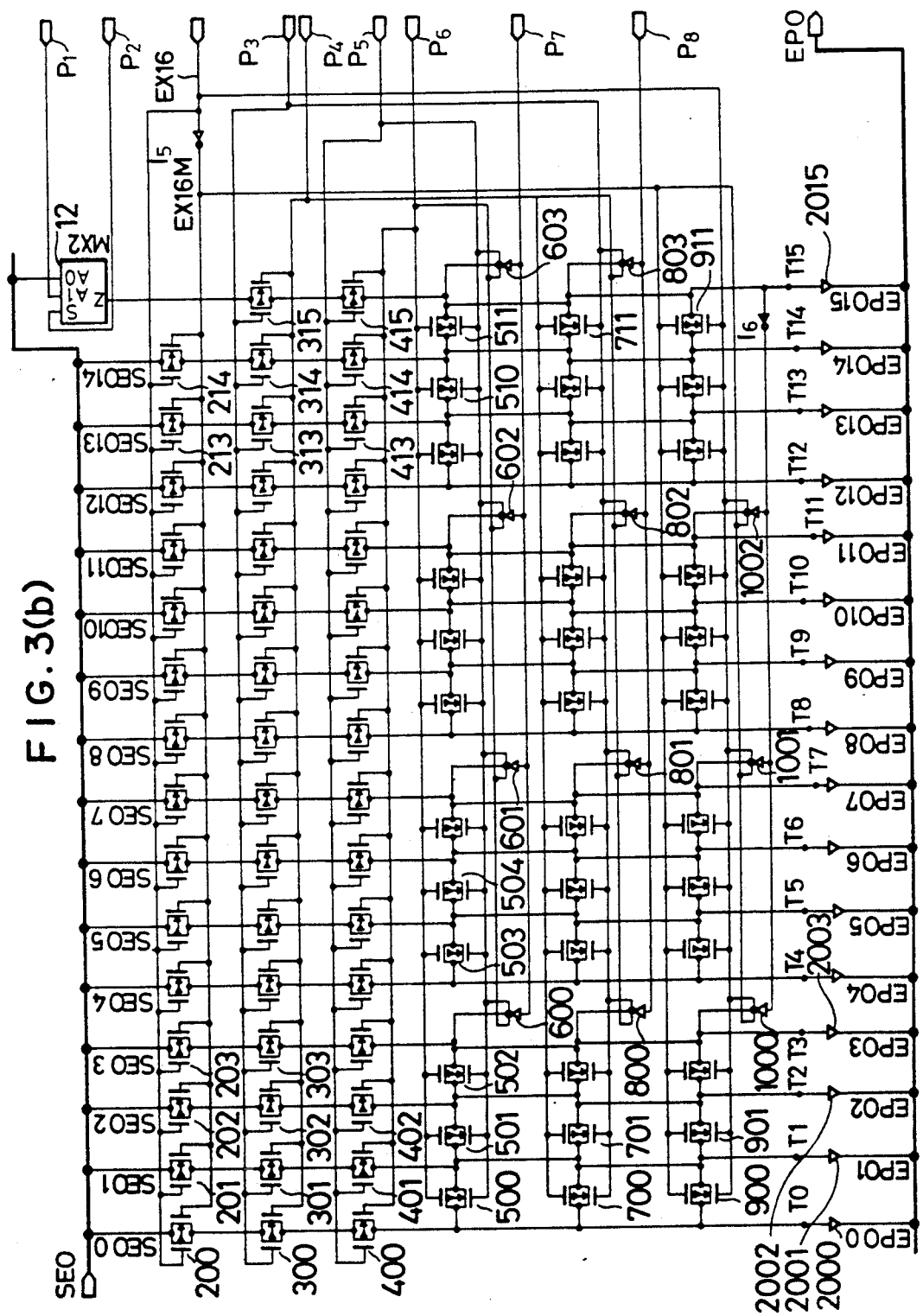
Figure 4:
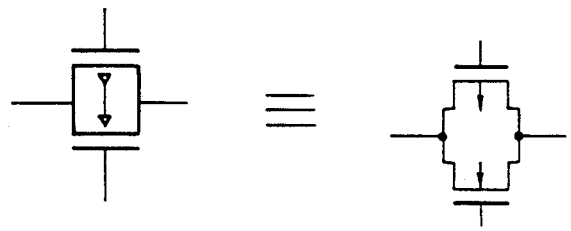
FIG. 4 is a schematic view showing a transfer CMOS.

FIGS. 3(a) and 3(b) show a logic circuit for bit expansion according to the present invention. Terminals of the logic circuit on the left-hand side of FIG. 3(a) are connected to terminals on the right-hand side of FIG. 3(b), respectively. In the figures, numerals 10, 11 and 12 represent multiplexers, and 200 to 214, 300 to 322, 400 to 426, 500 to 520, 700 to 717 and 900 to 911 represent CMOS transfer gates. As shown in FIG. 4, each of the transfer gates comprises a pair of P-channel transistor and N-channel transistor. Source electrodes of the transistors are connected to each other, and drain electrodes thereof are also connected to each other.

The CMOS transfer gates are connected in series to form respective stages. The stages of the CMOS transfer gates are arranged to correspond to the number of bits (thirty-two in this embodiment) to which expansion is sought.

Numerals 600 to 604, 800 to 804 and 1000 to 1002 are clocked inverters. Input terminals of the clocked inverters in the same stage are connected to each other. The clocked inverters 600 to 604 are turned ON with a control signal EX4 of 1, the clocked inverters 800 to 804 turned ON with a control signal EX8 of 1, and the clocked inverters 1000 to 1002 turned ON with a control signal EX16 of 1.

Numerals 2000 to 2031 are output drivers, 50 to 53 are AND gates, 61 and 62 OR gates, and I1 to I8 are normal inverters.

Figure 5A:
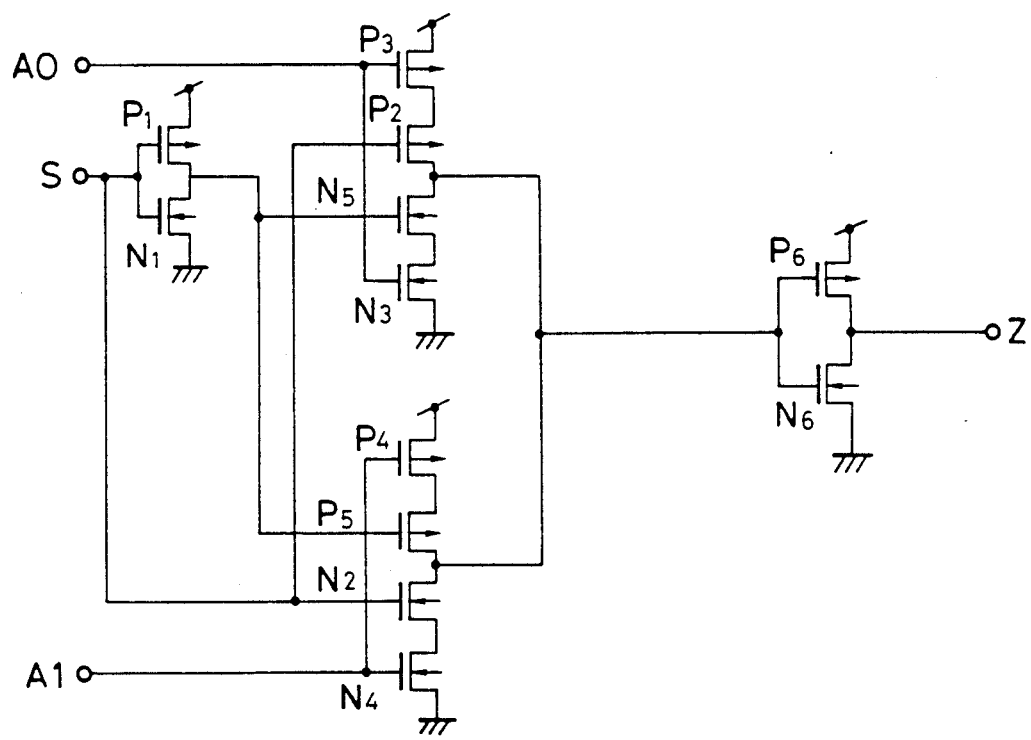
FIG. 5(a) is a view showing the details of a multiplexer shown in FIGS. 3(a) and 3(b)

FIG. 5(a) shows the details of one of the multiplexers 10 to 12. An input S of the multiplexer is connected to the gate electrodes of P-channel transistors P1 and P2 and N-channel transistors N1 and N2. A selection input A0 of the multiplexer is connected to transistors P3 and N3. A selection input A1 of the multiplexer is connected to transistors P4 and N4. Outputs from drain electrodes of the transistors P1 and N1 are connected to gate electrodes of transistors P5 and N5. Outputs from drain electrodes of the transistors P2, N5, N2 and P5 are connected to gate electrodes of transistors P6 and N6. Drain electrodes of the transistors P6 and N6 provide a final output Z.

Figure 5B:
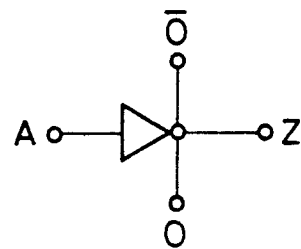
FIG. 5(b) is a view showing the details of a clocked inverter shown in FIGS. 3(a) and 3(b).
Figure 5B:
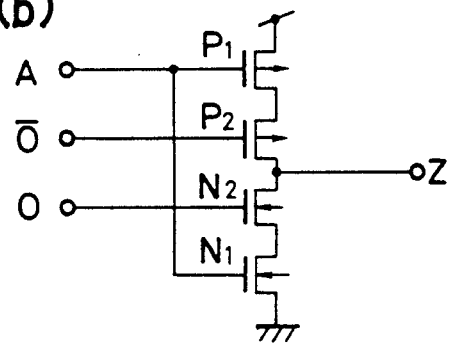

FIGS. 5(b) shows the details of one of the clocked inverters 600 to 604. An input terminal A of the clocked inverter is connected to the gate electrodes of P-channel transistor P1 and N-channel transistor N1. A clock input $\bar{\phi}$ is inputted into the gate electrode of a transistor P2, while a clock input $\phi$ is inputted into the gate electrode of a transistor N2. A common node of the transistors P2 and PN provides an output Z.

Operation of the logic circuit of the invention will be explained with reference to FIGS. 3(a), 3(b) and 5(a). A control signal SGNX will be "1" if data expansion is to be carried out, while the signal SGNX will be "0" if no data expansion is to be carried out. A control signal EP will be "1" if an expansion operation is to be carried out, while the signal EP will be "0" if no expansion operation is to be carried out. A control signal EX16 will be "1" if 16-bit input data is to be expanded to 32-bit data, while the signal EX16 will be "0" when no such operation is to be done. Similarly, a control signal EX8 will be "1" to expand 8-bit input data to 32-bit data, and a control signal EX4 will be "1" to expand 4-bit input data to 32-bit data. These control signals will be "0" when no corresponding expansion operation is to be done.

When 8-bit input data is subjected to data expansion to 32-bit data, the control signals will be SGNX=1, EP=1, EX8=1, and the remaining control signals will each be 0.

If 8-bit input data of "10010101" is provided to an input SE0, states of the circuit shown in FIGS. 3(a) and 3(b) will be those indicated with 1s, 0s, ONs and OFFs shown in the same figures.

Inputs SE00 to SE023 are neglected, and inputs SE028 to SE031 appear as they are on outputs EP028 to EP031. Since the control signal EX8 is 1, a node N270 is at low level (level 0) so that an input S of the multiplexer 10 may be 0. Therefore, the multiplexer 10 selects the input SE027 given to its input terminal A0 so that the output EP027 will be the input SE027.

The control signal EX4 of 0 turns ON the CMOS transfer gates 424 to 426 and OFF the CMOS transfer gates 518 to 520 so that the outputs EP024 to EP026 will be connected to the inputs SE024 to SE026, respectively. Namely, the lower eight output bits EP024 to EP031 are corresponding inputs as they are.

On the other hand, a node N230 is at high level (level 1) because the control signals are EX16=0 and EP=1. Therefore, an input terminal S of the multiplexer 11 receives "1" so that an input terminal A1 of the multiplexer 11 may be selected to output the input SE024 to a node N23.

Since the control signal EX4 is 0 at this time, the transfer gate 423 is turned ON while the transfer gate 517 is turned OFF, and the clocked inverter 604 provides an output of high impedance. Therefore, the signal at the node N23 appears at a node T23. Accordingly, the input SE024 is transferred to the output EP023 via an output driver 23. The control signal EX8 of 1 turns OFF the transfer gates 300 to 322 so that the inputs SE00 to SE022 may not be transferred to the outputs EP00 to EP022. However, the transfer gates 700 to 717 are turned ON so that the clocked inverters 800 to 804 and inverter I4 may operate to transfer the signal at the node T23, i.e., the input SE024 to each of nodes T0 to T22. As a result, the outputs EP00 to EP023 are each the same as the input SE024=1. Therefore, the outputs EP00 to EP031 will be twenty-four 1s and "10010101". In this way, 8-bit data is expanded to 32-bit data.

To perform no data expansion of 8-bit data, the control signal SGNX is set to 0 so that the input terminal A1 of the multiplexer 11 may be fixed to 0. Since the input S of the multiplexer 11 is 1, the multiplexer 11 selects its input terminal A1. As a result, the node N23 will be 0, which will be transferred to the node T23. Since the signal at the node T23 is transferred to the nodes T0 to T22, the outputs EP00 to EP031 will be twenty-four 0s and "10010101", thus achieving no data expansion.

Similarly, 4-bit data or 16-bit data may be expanded to 32-bit data. Explanations of these cases are omitted because they are quite similar to the one explained in the above.

If no data expansion is done, the control signals are set to EP=0, EX4=0, EX8=0 and EX16=0 so that the inputs SE00 to SE031 are given as they are to the outputs EP00 to EP031, respectively.

The number of elements needed for executing only the bit expansion or zero expansion in the semiconductor logic circuit of the invention is 286 which is about 61% of the 472 elements needed by the conventional selector circuit to achieve the same expansion.

If the AND gates 50 to 51 and output drivers 2000 to 2031 are included for selecting a bit expansion or no expansion, the present invention requires 414 elements which is 88% that needed by the prior art.

In addition, the present invention employs clock inverters each of which transfers an expansion bit to four higher bit positions in parallel at one time to achieve bit expansion or no bit expansion at high speed.

Various modifications will become possible for those skilled in the art after reviewing the teachings of the present disclosure without departing from the scope thereof.

What is claimed is:

1. A semiconductor logic circuit for receiving an input binary signal having a given bit length and for expanding said given bit length to an expansion bit length, said input binary signal having bits arranged in a given order of significance and having a most significant bit, said circuit comprising:

- a plurality of output lines, arranged in an output line order corresponding to said order of significance and including a single output line arranged in a position in said output line order corresponding with said most significant bit and further including a group of said output lines arranged in positions in said output line order which are more significant than said position of said single output line;
- a plurality of semiconductor switching elements for interconnecting adjacent output lines of said group of said output lines for placing said adjacent output lines at an equal logic level;
- a common control line for receiving a control signal and providing said control signal to said switching elements for enabling said switching elements for interconnecting said adjacent output lines;
- a mode control line for receiving an expansion signal indicative of said expansion bit length; and
- a buffer circuit, connected to said mode control line for receiving said expansion signal, including an additional semiconductor switching element enabled by said control signal for connecting one output line of said group of said output lines with said single output line arranged in said position corresponding with said most significant bit.

2. The semiconductor logic circuit as claimed in claim 1, wherein said buffer circuit comprises inverters and clocked inverters connected in series.

3. The semiconductor logic circuit as claimed in claim 2, wherein said clocked inverters receive said control signal as a clock signal to achieve a switching operation in cooperation with said plurality of semiconductor switching elements.

4. The semiconductor logic circuit as claimed in claim 1, wherein each of said plurality of semiconductor switching elements is a CMOS transfer gate comprising a P-channel transistor and an N-channel transistor, with sources of said transistors being connected to each other and drains of said transistors being connected to each other.

5. A semiconductor logic circuit for receiving an input binary signal having a given bit length and for expanding said given bit length to an expansion bit length, said input binary signal having bits arranged in a given order of significance and having a most significant bit, said circuit comprising:

- a plurality of bit input lines, arranged in an input line order corresponding to said order of significance and including a specific input line arranged in a position in said input line order corresponding with said most significant bit and further including a group of said input lines arranged in positions in said input line order which are more significant than said position of said single input line;
- a plurality of first semiconductor switching elements connected in a one-to-one correspondence in bit positions to respective input lines of said group of input lines;
- a first common control line for receiving a first control signal and providing said first control signal to said first semiconductor switching elements for selectively turning said first semiconductor switching elements on or off;
- a plurality of output lines;
- a plurality of second semiconductor switching elements for connecting said specific input line to said output lines to place said output lines at a logic level equal to a logic level of said specific input line; and
- a second common control line for receiving a second control signal and providing said second control signal to said second semiconductor switching elements for selectively turning said second semiconductor switching elements on or off;
- said first semiconductor switching elements being turned off by said first control signal when said second semiconductor switching elements are turned on by said second control signal.

6. The semiconductor logic circuit as claimed in claim 5, wherein only some said output lines switching elements are connected to said specific input line by said second semiconductor switching elements.

7. The semiconductor logic circuit as claimed in claim 5, wherein said specific input line is connected to said first semiconductor switching elements which are connected to certain ones of said input lines distant from said specific input line.

8. The semiconductor logic circuit as claimed in claim 5, wherein said specific input line is connected to said first semiconductor switching elements which are connected to certain ones of said input lines distant from said specific input line via a buffer circuit.

9. The semiconductor logic circuit as claimed in claim 8, wherein said buffer circuit connects every predetermined one of said input lines starting from said specific input line.

10. The semiconductor logic circuit as claimed in claim 8, wherein said buffer circuit comprises inverters and clocked inverters connected in series.

11. The semiconductor logic circuit as claimed in claim 10, wherein each of said clocked inverters receives said second control signal as a clock signal to perform a switching operation in cooperation with said second semiconductor switching elements.

12. The semiconductor logic circuit as claimed in claim 8, wherein each of said first and second semiconductor switching elements is a CMOS transfer gate comprising a P-channel transistor and an N-channel transistor, sources of said transistors being connected to each other and drains of said transistors being connected to each other.

13. A logic circuit for expanding a bit length of input data supplied as bit signals comprising:

- a plurality of first input lines receiving less significant bit signals of said input data;
- a plurality of first output lines connected respectively with said first input lines in order to output said less significant bit signals received on said first input lines;
- a plurality of second input lines receiving more significant bit signals of said input data than said first input lines;
- a plurality of second output lines corresponding to bit signals more significant that said more significant bit signals received by said second input lines;
- a multiplexer, connected respectively at its input terminals to one first input line of said first input lines corresponding to a most significant bit signal of aid first input lines and to one second input line of said second input lines corresponding to a least significant bit signal of said second input lines and connected at its output terminal to one second output line of said second output lines corresponding to a least significant bit signal of said second output lines, for outputting selectively a bit signal from said one first input line corresponding to said most significant bit signal, or a bit signal from said one second input line or a "0" bit signal;

a plurality of first switching means for connecting corresponding ones of said second input lines and said second output lines at respective bit signal positions, said first switching means being controlled by a common control signal input thereto; and a plurality of second switching means connected between said one second output line and other second input lines of said second output lines, said second switching means being controlled by a second common control signal input thereto for transferring a bit signal from said one second output line to said other second output lines of said second output lines when said first switching means disconnect said second input lines and said second output lines.

14. The circuit of claim 13, further comprising:

a second mutliplexer, connected respectively at its input terminals, with another second input line of said second input lines and a specific one of said second input lines corresponding to a bit signal position just one bit more significant than that of said another second input line of said second input lines and connected at its output terminal, with a specific one of said second output lines for outputting selectively a bit signal from said specific one of said second input lines, a bit signal from said another second input line or a "0" bit signal;

a plurality of third switching means connected between corresponding ones of said second input lines and said first switching means at each bit signal position more significant than that of said specific second input line, said third switching means being controlled by a third common control signal; and a plurality of fourth switching means connected between said specific second output line and others of said second output lines corresponding to bit signals more significant than said specific second output line, said fourth switching means being controlled by a fourth common control signal for transferring a bit signal on said specific second output line to other said second output lines when said first switching means connect said second input lines and said second output lines, and said second and third switching means are in disconnect states.

* * * * *